United States Patent
Dizon

(10) Patent No.: US 10,077,934 B1
(45) Date of Patent: Sep. 18, 2018

(54) ICE CHEST INSERT AND TABLE

(71) Applicant: Jordon Dizon, Littleton, CO (US)

(72) Inventor: Jordon Dizon, Littleton, CO (US)

(*) Notice: Subject to any disclaimer, the term of this patent is extended or adjusted under 35 U.S.C. 154(b) by 0 days.

(21) Appl. No.: 15/808,472

(22) Filed: Nov. 9, 2017

(51) Int. Cl.
*F25D 25/00* (2006.01)
*A47B 1/10* (2006.01)
*A47B 37/00* (2006.01)
*F25D 3/02* (2006.01)
*A47J 47/00* (2006.01)

(52) U.S. Cl.
CPC ............ *F25D 25/005* (2013.01); *A47B 1/10* (2013.01); *A47B 37/00* (2013.01); *A47J 47/005* (2013.01); *F25D 3/02* (2013.01)

(58) Field of Classification Search
CPC ......... F25D 3/02; F25D 25/005; A47B 37/00; A47B 1/00; A47B 33/00
USPC ..... 108/24, 25, 26, 102, 143, 14; 220/592.2, 220/592.02, 592.03; 206/546
See application file for complete search history.

(56) References Cited

U.S. PATENT DOCUMENTS

| 2,059,957 | A | * | 11/1936 | Mendenhall | A61G 13/105 108/173 |
|---|---|---|---|---|---|
| 2,603,500 | A | * | 7/1952 | Messier | A47B 31/00 108/77 |
| 2,696,246 | A | * | 12/1954 | Putnam | B60N 2/2854 108/129 |
| 2,745,705 | A | * | 5/1956 | Morgan | B60N 3/002 108/143 |
| 3,313,584 | A | * | 4/1967 | Rocker | A47D 5/00 108/63 |
| 3,760,744 | A | * | 9/1973 | Cruckshank | A47B 1/08 108/102 |
| 3,777,673 | A | * | 12/1973 | Blazey | A47B 13/08 108/27 |
| 3,873,114 | A | * | 3/1975 | Brown | A47B 31/00 280/30 |
| 3,916,802 | A | * | 11/1975 | Virtue | A47B 45/00 108/102 |
| 3,967,333 | A | * | 7/1976 | Boyd | A47D 11/00 248/103 |
| 4,286,525 | A | * | 9/1981 | Willmore | A47B 1/08 108/102 |
| 5,431,298 | A | * | 7/1995 | Ahn | A45C 9/00 206/45.2 |
| 5,437,165 | A |  | 8/1995 | White et al. | |

(Continued)

*Primary Examiner* — Jose V Chen
(74) *Attorney, Agent, or Firm* — Dale J. Ream

(57) ABSTRACT

An ice chest insert and table for insertion into an insulated cooler includes a first table portion having a first bottom wall, opposed first side walls extending upwardly from side edges of the first bottom wall and a first end wall spanning between ends of the first side walls. The insert and table includes a second table portion having a second bottom wall, second side walls extending upwardly from side edges of the second bottom wall and a second end wall spanning ends of the second side walls. The first and second table portions connect in a length adjustable arrangement. An access panel is pivotally coupled to the first bottom wall proximate the access opening and pivotally movable between a closed configuration covering the access opening and an open configuration allowing access through the access opening. Length adjustable support members support the table inside and outside of an ice chest.

14 Claims, 8 Drawing Sheets

(56) References Cited

U.S. PATENT DOCUMENTS

| | | | | |
|---|---|---|---|---|
| 5,551,558 A | * | 9/1996 | Bureau | A45C 9/00 |
| | | | | 190/11 |
| 5,572,934 A | * | 11/1996 | Aldridge | A47B 3/0912 |
| | | | | 108/24 |
| 5,915,602 A | * | 6/1999 | Nelson | B67D 1/06 |
| | | | | 108/143 |
| 6,131,929 A | * | 10/2000 | Haley | A63F 9/001 |
| | | | | 280/47.34 |
| 6,302,097 B1 | * | 10/2001 | Rivera | A47J 37/0763 |
| | | | | 126/305 |
| 6,698,230 B1 | | 3/2004 | Brusky | |
| 7,290,490 B2 | | 11/2007 | Goldberg et al. | |
| 7,987,799 B2 | * | 8/2011 | Lange | A47B 45/00 |
| | | | | 108/102 |
| 8,356,712 B2 | * | 1/2013 | Piazza, Jr. | A45C 9/00 |
| | | | | 108/14 |
| 8,490,551 B1 | * | 7/2013 | Wagner | A47B 31/04 |
| | | | | 108/25 |
| 9,188,379 B2 | | 11/2015 | Jimenez | |
| 2009/0056595 A1 | * | 3/2009 | Dean | A47B 3/0911 |
| | | | | 108/24 |
| 2011/0048288 A1 | * | 3/2011 | Sheldon | A22C 25/06 |
| | | | | 108/25 |
| 2013/0186306 A1 | * | 7/2013 | Thornley | A47B 37/00 |
| | | | | 108/24 |

* cited by examiner

ICE CHEST INSERT AND TABLE

BACKGROUND OF THE INVENTION

The present invention relates generally to ice chests and coolers and, more particularly, to an ice chest insert and table that may be inserted into the interior space of ice chests of all sizes and which enables dry food items to be stored above the ice and water line while beverages and cold-stored items may be nestled into the ice and easily accessed without removing the entire insert.

Packing a cooler or ice chest with ice, food, and beverages, such as when preparing for tailgating, a picnic, or even for lunch on the job, is that dry food items such as sandwiches, crackers, potato chips, and the like become soggy or lose their crispiness. The alternative is to leave dry food items out in the heat while only nestling canned beverages or sealed containers in the iced cooler. Another problem is that products that partition the interior of a cooler for the purpose of separating food and beverage items often require the entire shelving system or insert to be removed from the cooler in order to access beverage cans or other containers nestled in the ice or cold water. Although various organizer systems are presumably effective for their intended uses, the existing devices are still inadequate to adjust to both longitudinal and vertical size differences of various coolers; in other words, existing products are not universally useful for use with virtually any cooler or ice chest. In addition, the insert may not also be useful as a serving or working table when removed from the cooler.

Therefore, it would be desirable to have an ice chest insert and table that overcomes the limitations identified above and satisfies the objects of the invention identified below.

SUMMARY OF THE INVENTION

An ice chest insert and table for insertion into an insulated cooler according to the present invention includes a first table portion having a first bottom wall and a pair of first side walls extending upwardly from opposed side edges of the first bottom wall and a first end wall spanning between first ends of the first side walls, respectively. The insert and table includes a second table portion having a second bottom wall and a pair of second side walls extending upwardly from opposed side edges of the second bottom wall and a second end wall spanning between first ends of the second side walls, respectively. The first and second table portions connect in a longitudinally length adjustable arrangement. An access panel is pivotally coupled to the first bottom wall proximate the access opening and pivotally movable between a closed configuration covering the access opening and an open configuration allowing access through the access opening. Length adjustable support members may be coupled to respective bottom walls for supporting the ice chest insert and table both inside and outside of an ice chest.

Therefore, a general object of this invention is to provide an ice chest insert and table for insertion into an ice chest and that is configured to store food items above the ice or water level while providing easy access to items nestled in the ice.

Another object of this invention is to provide an ice chest insert and table, as aforesaid, having first and second table portions that are adjustable to be complementary to the length of the ice chest.

Still another object of this invention is to provide an ice chest insert and table, as aforesaid, having multiple support legs that are adjustable to be complementary to the depth of the ice chest.

Yet another object of this invention is to provide an ice chest insert and table, as aforesaid, having an access panel that is pivotally movable between open and closed configurations so as to regulate access to items submerged in the ice.

A further object of this invention is to provide an ice chest insert and table, as aforesaid, having handles for lifting and removing the entire ice chest insert and table out of the ice chest and moving it to another desired location, such as for tailgating, a picnic, or storage.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
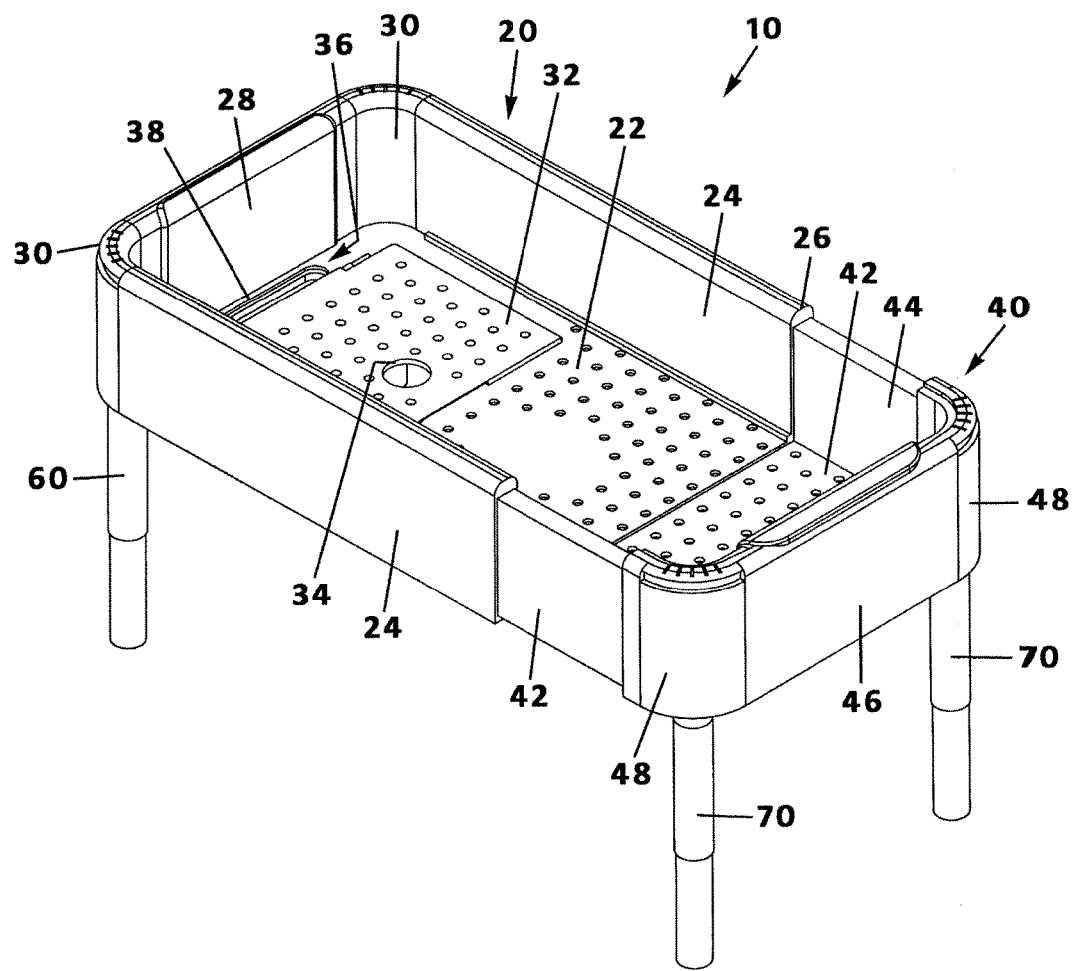
FIG. 1 is a perspective view of an ice chest insert and table according to a preferred embodiment of the present invention, illustrated in partially expanded configuration.
Figure 2A:
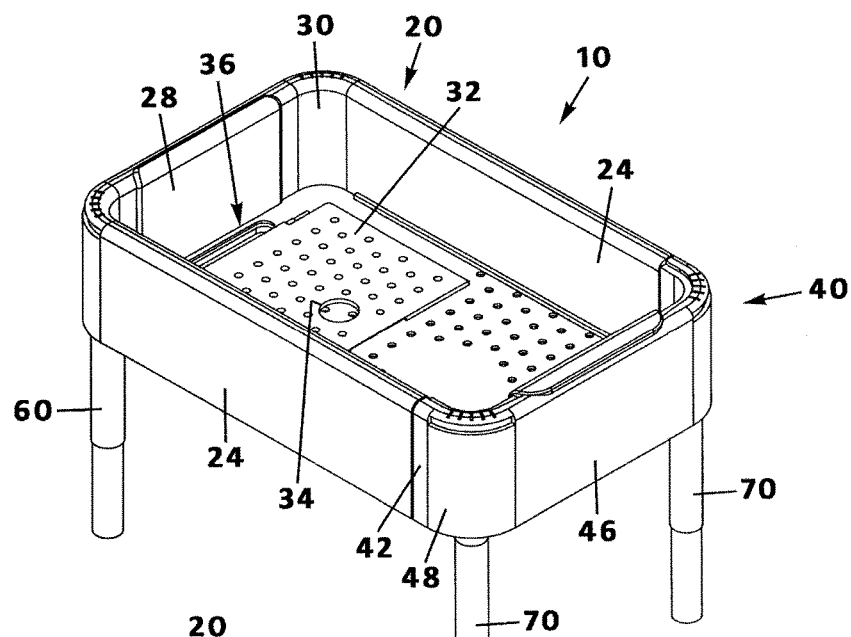
FIG. 2a is another perspective view of the ice chest insert and table as in FIG. 1 illustrated in a retracted configuration.
Figure 2B:
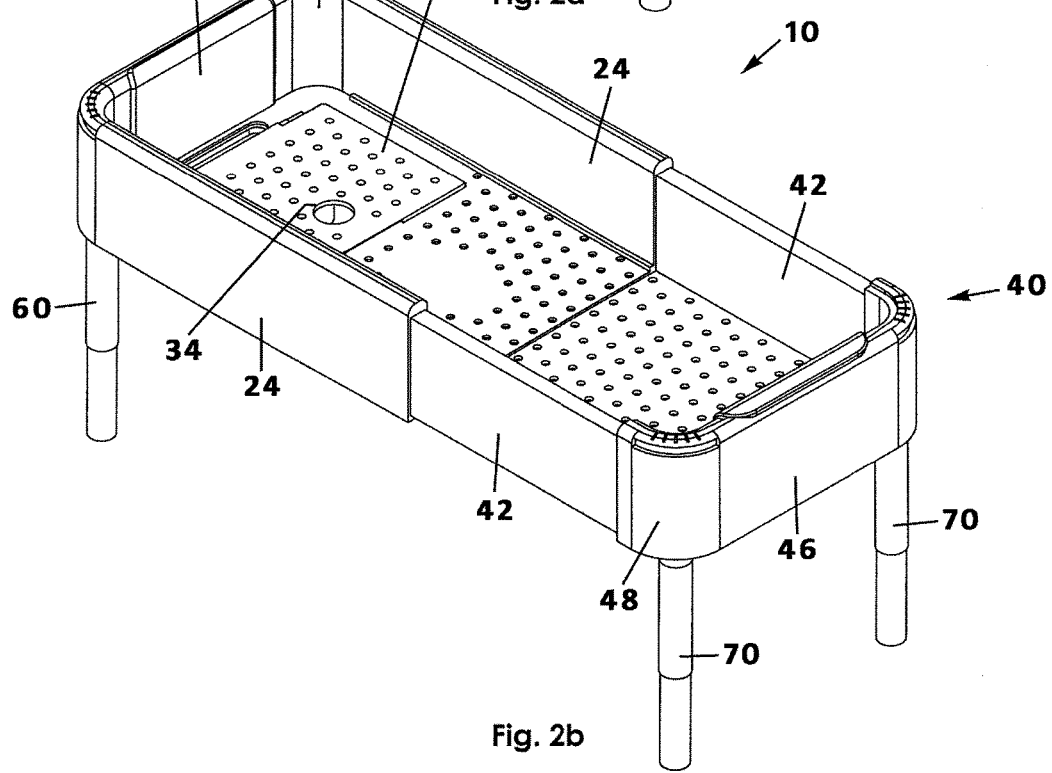
FIG. 2b is another perspective view of the ice chest insert and table as in FIG. 1 illustrated in fully expanded configuration.
Figure 3:
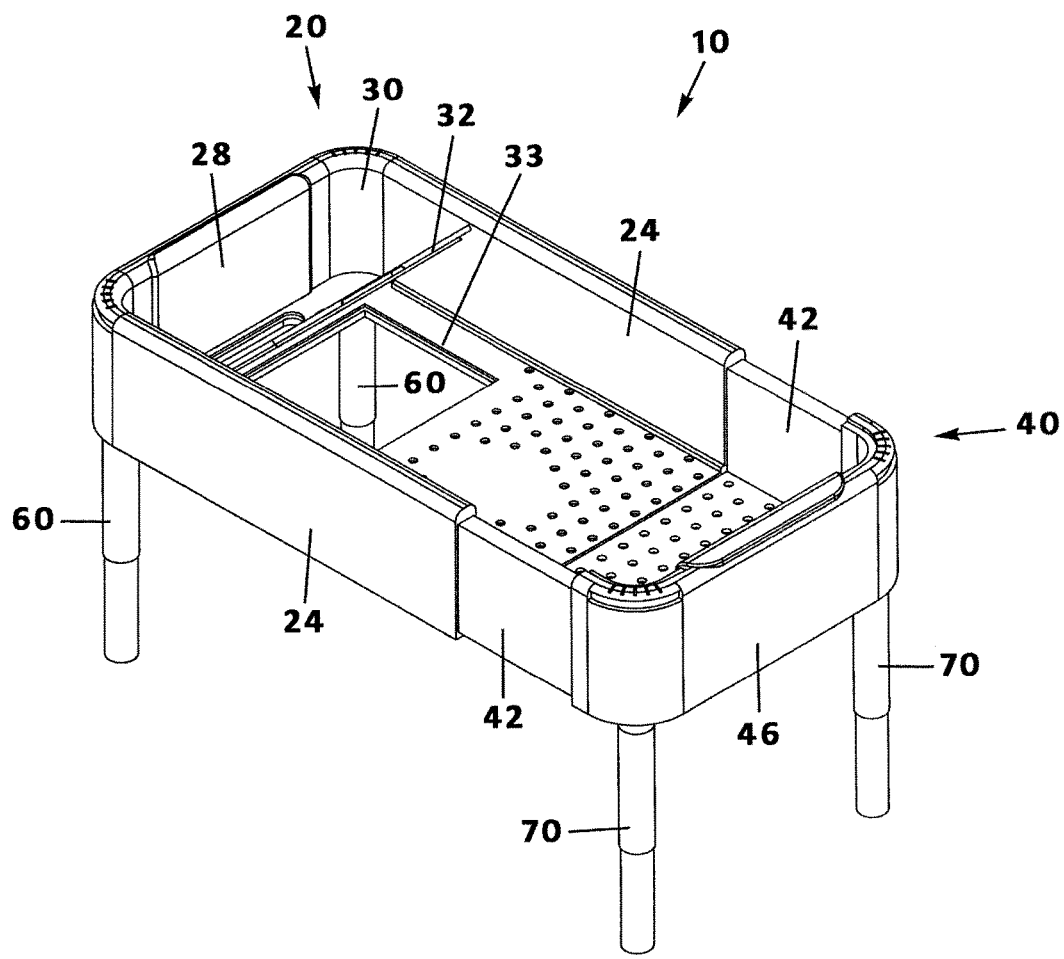
FIG. 3 is another perspective view of the ice chest insert and table as in FIG. 1 illustrated in a partially expanded configuration and with the access panel in an open configuration.
Figure 4:
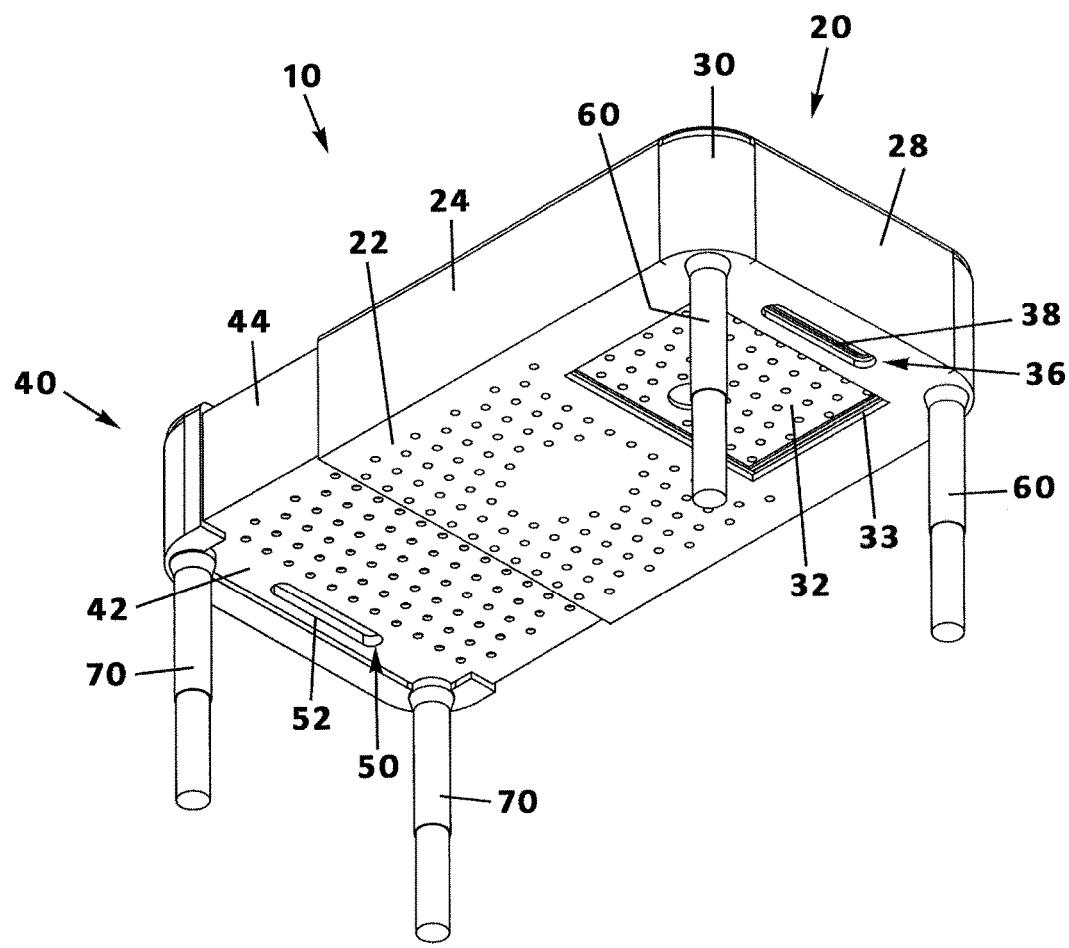
FIG. 4 is a perspective view from a lower angle of the ice chest insert and table as in FIG. 2b.
Figure 5:
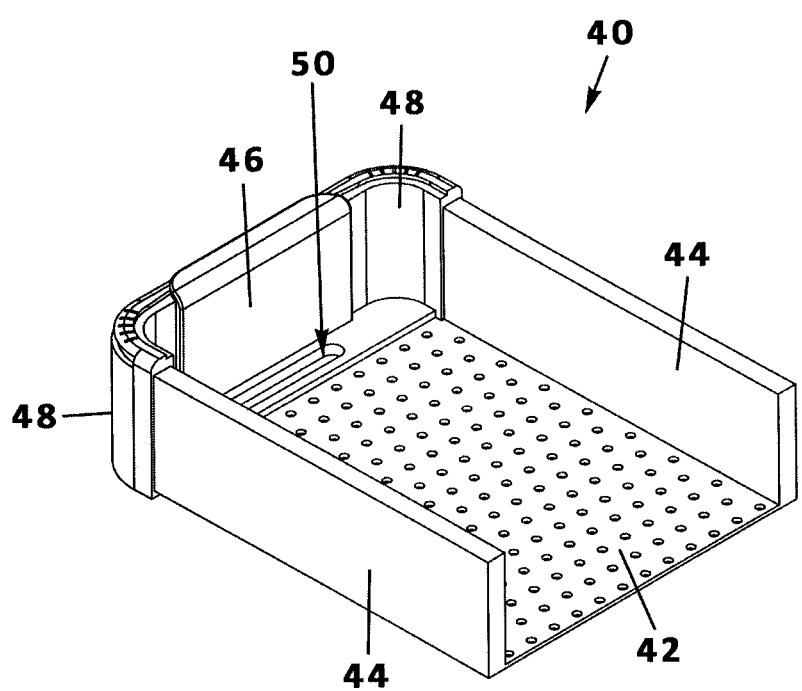
FIG. 5 is a perspective view of a second table portion removed from the remainder of the invention.
Figure 6:
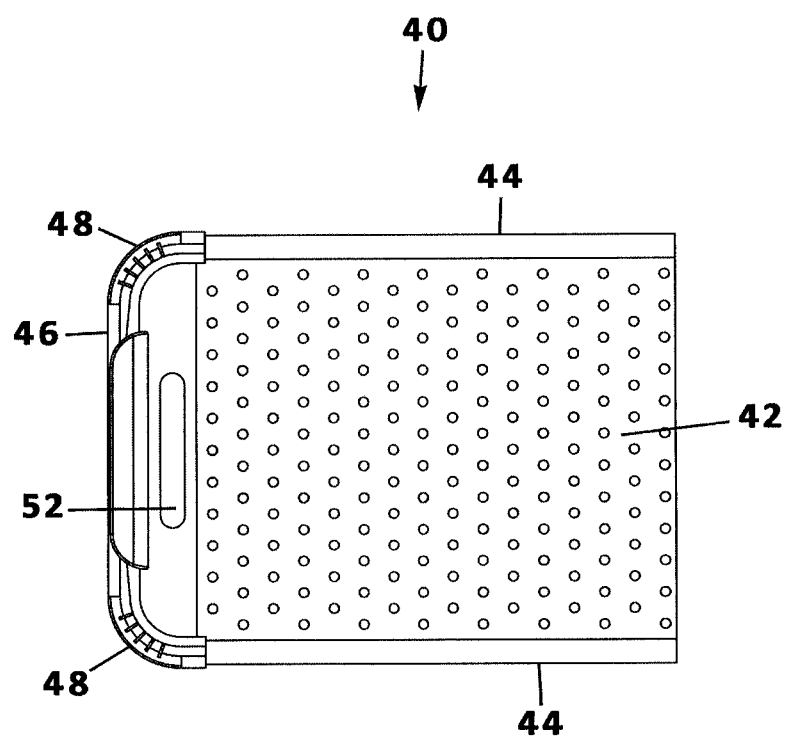
FIG. 6 is a top view of the second table portion as in FIG. 5.
Figure 7:
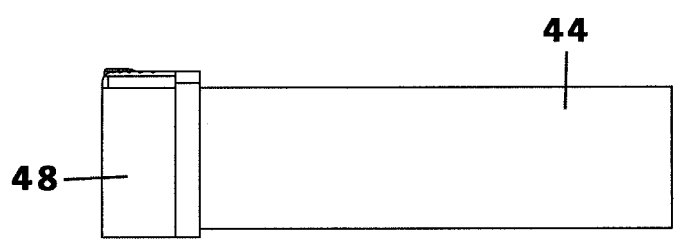
FIG. 7 is a side view of the second table portion as in FIG. 5.

An ice chest insert and table according to a preferred embodiment of the present invention will now be described in detail with reference to FIGS. 1 to 10 of the accompanying drawings. The ice chest insert and table 10 includes a first table portion 20 and a second table portion 40 coupled in a longitudinally length adjustable arrangement, an access panel 32, and respective length adjustable support members 60, 70.

The ice chest insert and table 10 includes a first table portion 20 configured to support and hold multiple food or beverage items above the level of ice or water inside an ice chest (not shown). The first table portion 20 includes a bottom wall (referred to hereafter as a first bottom wall 22) having a flat or planar configuration and having side and end edges. Preferably, the first bottom wall 22 has a rectangular shaped configuration as a typical ice chest also has a rectangular configuration. The first bottom wall 22 is constructed of a thin material, such as plastic, and is light weight yet durable, the first bottom wall 22 being of solid planar construction except as described otherwise below.

The first table portion 20 includes a pair of oppositely disposed side walls (referred to as first side walls 24), each extending upwardly from opposed side edges of the first bottom wall 22. The height of the first side walls 24 will determine how "deep" the first table portion 20 is. An end wall (referred to as a first end wall 28) extends or spans between opposed first ends of the pair of first side walls 24 such that an outside end of the first table portion 20 is closed. In an embodiment, the first table portion 20 includes a pair of first corner panels 30 each being sandwiched between an end of the first end wall 28 and a first side wall 24, respectively. Each first corner panel 30 has a rounded, curved, or arcuate configuration such that the first table portion 20 has a rounded configuration. In another aspect, each of the first side walls 24 defines a hollow interior space and has first outer ends 26 each having an open configuration allowing access to the hollow interior space as will be described later in more detail.

Similarly, the ice chest insert and table 10 includes a second table portion 40 having a construction that is substantially similar to that of the first table portion 20. More particularly, the second table portion 40 includes a bottom wall (referred to hereafter as a second bottom wall 42) having a flat or planar configuration and having side and end edges. Preferably, the second bottom wall 42 has a rectangular shaped configuration as a typical ice chest also has a rectangular configuration. The second bottom wall 42 is constructed of a thin material, such as plastic, and is light weight yet durable, the second bottom wall 42 being of solid construction except as described otherwise below.

The second table portion 40 includes a pair of oppositely disposed side walls (referred to as second side walls 44), each extending upwardly from opposed side edges of the second bottom wall 42. The height of the second side walls 44 will determine how "deep" the second table portion 40 is. An end wall (referred to as a second end wall 46) extends or spans between opposed first ends of the pair of second side walls 44 such that an outside end of the second table portion 40 is closed. In an embodiment, the second table portion 40 includes a pair of second corner panels 48 each being sandwiched between an end of the second end wall 46 and a second side wall 44, respectively. Each second corner panel 48 has a rounded, curved, or arcuate configuration such that the second table portion 40 has a rounded configuration.

The first table portion 20 and the second table portion 40 may be coupled together in a longitudinally length adjustable manner. Second ends of each second side wall 44 are closed (i.e. male ends). More particularly, the open ends (i.e. female ends) of the first side walls 24 are configured to receive corresponding second side ends of respective second side walls 44 into the hollow interior spaces defined by the first side walls 24, respectively. The second side walls 44 are selectively moved in or out of corresponding first side walls 24 in a telescopic manner.

In another aspect, the first bottom wall 22 defines an access opening 33 that gives access to an area in the ice chest below the first bottom wall 22. The access opening 33 is large enough for insertion or removal of beverage cans or even moderate size food containers. Further, an access panel 32 is pivotally coupled to the first bottom wall 22 proximate or, preferably, immediately adjacent the access opening 33 such as with hinges. Accordingly, the access panel 32 is pivotally movable between 1) a closed configuration covering the access opening 33 and blocking access to the area below the first bottom wall 22 and 2) an open configuration allowing access through the access opening 33.

The ice chest insert and table 10 includes a first handle 36 and a second handle 50 wherewith a user may grasp, lift, and carry the invention. In an embodiment, a first handle 36 is situated on either the first bottom wall 22 adjacent the first end wall 28 or on the first end wall 28 itself. In an embodiment, the first handle 36 may be a first slot 38 defined by the first bottom wall 22 or first end wall 28. Similarly, a second handle 50 is situated on either the second bottom wall 42 adjacent the second end wall 46 or on the second end wall 46 itself. In an embodiment, the second handle 50 may be a second slot 52 defined by the second bottom wall 42 or first end wall 28. It is understood that alternative or additional handles may be included, such as atop respective end walls or side walls. The access panel 32 may include an access handle 34 configured to be grasped by a user so as to move the access panel 32 between closed and opened configurations. The access handle 34 may be an aperture defined through the access panel 32 itself or be in the form of special hardware.

In an embodiment, the first bottom wall 22 forms a plurality of vent holes spaced apart from one another and configured to allow air to flow through the first bottom wall 22. Similarly, the second bottom wall 42 forms a plurality of vent holes spaced apart from one another and configured to allow air to flow through the second bottom wall 42. In addition, the access panel 32 itself may define a plurality of spaced apart vent holes to allow air circulation within the ice chest. The holes may be created through the molding process or bored mechanically as would be understood by a manufacturer of the present invention.

Each bottom wall may include one or more leg members for supporting the structures above, either inside or outside of an ice chest. More particularly, a pair of first support members 60 is coupled to a bottom surface of the first bottom wall 22 and extends downwardly, the pair of first support members 60 being spaced apart from one another and positioned adjacent to the first side wall 24 or first corner panels 30, respectively. Similarly, a pair of second support members 70 is coupled to a bottom surface of the second bottom wall 42 and extends downwardly, the pair of second support members 70 being spaced apart from one another and positioned adjacent to the second side wall 44 or second corner panels 48, respectively. Preferably, each of said pair of first and second support members is length adjustable, such as in a pin-and-hole adjustment arrangement, spring loaded fasteners, friction fit telescopic structures, or the like.

Figure 8:
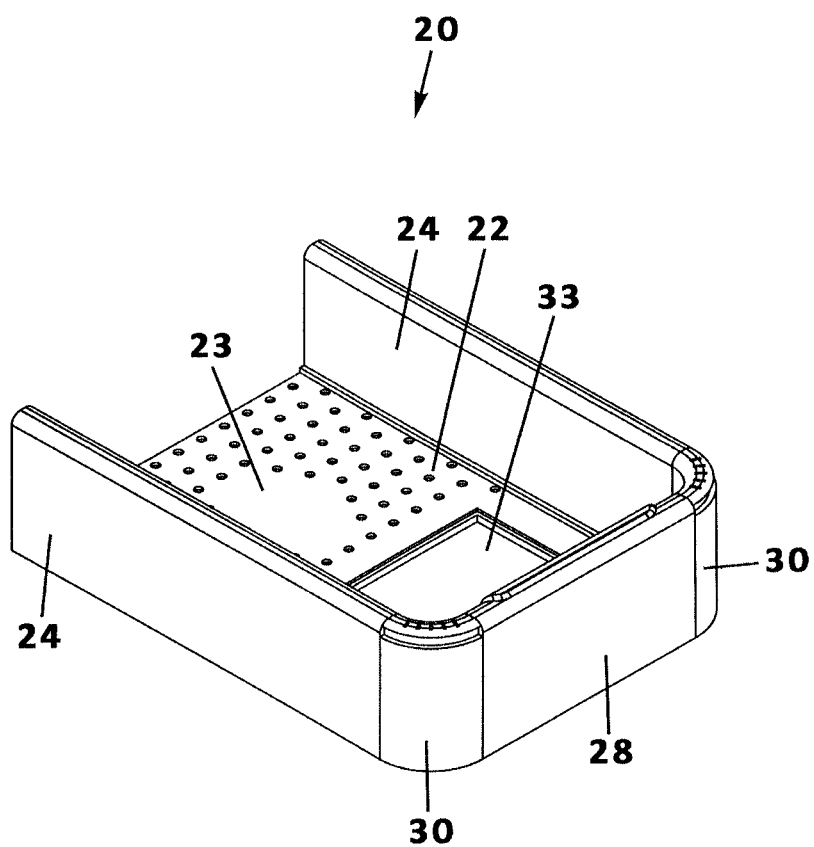
FIG. 8 is a perspective view of a first table portion removed from the remainder of the invention.
Figure 9:
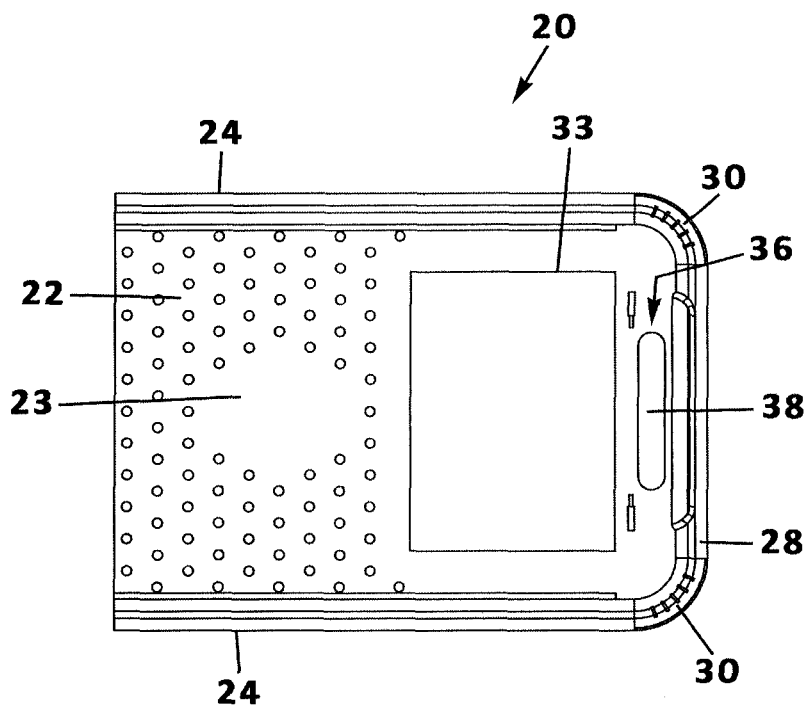
FIG. 9 is a top view of the first table portion as in FIG. 5.
Figure 10:
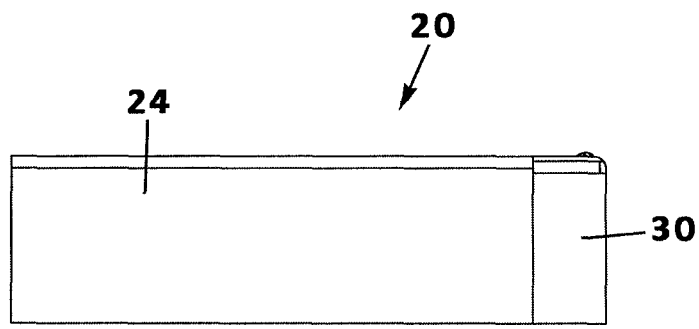
FIG. 10 is a side view of the first table portion as in FIG. 5.

In another aspect, the first bottom wall 22 may include a specific area having a smooth surface that is useful for food preparation, for a writing surface, and the like. In an embodiment, this area may be used as a cutting board 23 (FIGS. 8 and 9).

In use, the ice chest insert and table 10 may be adjusted according to the size of ice chest for which it is to be inserted. As described above, the second side walls 44 of the second table portion 40 are selectively received into the first side walls 24 of the first table portion 20 and the second bottom wall 42 is configured to slide along (beneath) the first bottom wall 22. Accordingly, the second table portion 40 and first table portion 20 may be slidably adjusted in a length or longitudinal manner. Then, the leg members may be adjusted for height to be complementary to the vertical dimension of the ice chest and even depending the depth of ice therein (as this relates to the depth of ice water as the ice melts). The intent, of course, is to keep the bottom walls of respective table portions dry as they will hold and support food items above the ice. When a beverage submerged in the ice is desired, the access panel 32 may be opened and the beverage removed. In other words, the entire table insert need not be removed from the ice chest in order to remove a single item below the bottom walls of the insert. However, the entire ice chest insert and table 10 may be removed from the ice chest and used independently, such as used as a serving or eating table while tailgating, picnicking, or the like.

It is understood that while certain forms of this invention have been illustrated and described, it is not limited thereto except insofar as such limitations are included in the following claims and allowable functional equivalents thereof.

The invention claimed is:

1. An ice chest insert and table for insertion into an insulated cooler, comprising:
   a first table portion having a first bottom wall and a pair of first side walls extending upwardly from opposed side edges of said first bottom wall and a first end wall spanning between first ends of said first side walls, respectively;
   wherein said pair of first side walls define a hollow interior space and include second ends defining an opening in communication with said hollow interior space;
   a second table portion having a second bottom wall and a pair of second side walls extending upwardly from opposed side edges of said second bottom wall and a second end wall spanning between first ends of said second side walls, respectively;
   wherein said second side walls include second ends received into said hollow interior space of said pair of first side walls, respectively;
   wherein said first bottom wall defines an access opening;
   an access panel pivotally coupled to said first bottom wall proximate said access opening and pivotally movable between a closed configuration covering said access opening and an open configuration allowing access through said access opening;
   wherein said access panel defines an aperture for moving said access panel between said closed configuration and said open configuration.

2. The ice chest insert and table as in claim 1, wherein:
   said first bottom wall includes a first handle proximate said first end wall;
   said second bottom wall includes a second handle proximate said second wall.

3. The ice chest insert and table as in claim 2, wherein:
   said first handle is a first slot passing through said first bottom wall; and
   said second handle is a second slot passing through said second bottom wall.

4. The ice chest insert and table as in claim 1, wherein:
   said first bottom wall defines a plurality of vent holes spaced apart therealong;
   said second bottom wall defines a plurality of vent holes spaced apart therealong;
   said plurality of vent holes of said first and second bottom walls, respectively, allow air to pass therethrough.

5. The ice chest insert and table as in claim 1, wherein:
   said first side walls are coupled to said first end wall with first corner panels, respectively, each said first corner panel having a rounded configuration;
   said second side walls are coupled to said second end walls with second corner panels, respectively, each said second corner panel having a rounded configuration.

6. The ice chest insert and table as in claim 5, further comprising:
   a pair of first support members coupled to and extending downwardly from said first bottom wall proximate said first corner panels, respectively;
   a pair of second support members coupled to and extending downwardly from said second bottom wall proximate said second corner panels.

7. The ice chest insert and table as in claim 1, further comprising:
   a pair of first support members coupled to and extending downwardly from said first bottom wall proximate said first end wall, respectively;
   a pair of second support members coupled to extending downwardly from said second bottom wall proximate said second end wall, respectively.

8. The ice chest insert and table as in claim 7, wherein:
   said pair of first support members is length adjustable; and
   said pair of second support members is length adjustable.

9. An ice chest insert and table for insertion into an insulated cooler, comprising:
   a first table portion having a first bottom wall and a pair of first side walls extending upwardly from opposed side edges of said first bottom wall and a first end wall spanning between first ends of said first side walls, respectively;
   wherein said pair of first side walls define a hollow interior space and include second ends defining an opening in communication with said hollow interior space;
   a second table portion having a second bottom wall and a pair of second side walls extending upwardly from opposed side edges of said second bottom wall and a second end wall spanning between first ends of said second side walls, respectively;
   wherein said second side walls include second ends received into said hollow interior space of said pair of first side walls, respectively;
   wherein said first bottom wall defines an access opening;
   an access panel pivotally coupled to said first bottom wall proximate said access opening and pivotally movable between a closed configuration covering said access opening and an open configuration allowing access through said access opening;
   wherein said access panel includes an access handle wherewith moving said access panel between said closed configuration and said open configuration;
   wherein said access handle is an aperture defined by said access panel;
   wherein:
     said first bottom wall defines a plurality of vent holes spaced apart therealong;
     said second bottom wall defines a plurality of vent holes spaced apart therealong;
     said plurality of vent holes of said first and second bottom walls, respectively, allow air to pass therethrough;
     said access panel defines a plurality of vent holes spaced apart from one another for allowing air to pass therethrough;
   a pair of first support members coupled to and extending downwardly from said first bottom wall proximate said first end wall, respectively;
   a pair of second support members coupled to extending downwardly from said second bottom wall proximate said second end wall, respectively.

10. The ice chest insert and table as in claim 9, wherein:
    said pair of first support members is length adjustable; and
    said pair of second support members is length adjustable.

11. The ice chest insert and table as in claim 9, further comprising:
- a first handle proximate one of said first bottom wall or said first end wall; and
- a second handle proximate one of said second bottom wall or said second end wall.

12. The ice chest insert and table as in claim 11, wherein:
- said first handle is a first slot passing through said first bottom wall; and
- said second handle is a second slot passing through said second bottom wall.

13. The ice chest insert and table as in claim 9, wherein:
- said first side walls are coupled to said first end wall with first corner panels, respectively, each said first corner panel having a rounded configuration;
- said second side walls are coupled to said second end walls with second corner panels, respectively, each said second corner panel having a rounded configuration.

14. An ice chest insert and table for insertion into an insulated cooler, comprising:
- a first table portion having a first bottom wall and a pair of first side walls extending upwardly from opposed side edges of said first bottom wall and a first end wall spanning between first ends of said first side walls, respectively;
- wherein said pair of first side walls define a hollow interior space and include second ends defining an opening in communication with said hollow interior space;
- a second table portion having a second bottom wall and a pair of second side walls extending upwardly from opposed side edges of said second bottom wall and a second end wall spanning between first ends of said second side walls, respectively;
- wherein said second side walls include second ends received into said hollow interior space of said pair of first side walls, respectively;
- wherein said first bottom wall defines an access opening;
- an access panel pivotally coupled to said first bottom wall proximate said access opening and pivotally movable between a closed configuration covering said access opening and an open configuration allowing access through said access opening;
- wherein:
    - said access panel includes an access handle wherewith moving said access panel between said closed configuration and said open configuration;
    - said first bottom wall defines a plurality of vent holes spaced apart therealong;
    - said second bottom wall defines a plurality of vent holes spaced apart therealong;
    - said plurality of vent holes of said first and second bottom walls, respectively, allow air to pass therethrough;
    - said access panel defines a plurality of vent holes spaced apart from one another for allowing air to pass therethrough;
- a pair of first support members coupled to and extending downwardly from said first bottom wall proximate said first end wall, respectively;
- a pair of second support members coupled to extending downwardly from said second bottom wall proximate said second end wall, respectively;
- wherein said first bottom wall includes a cutting board situated amidst said plurality of vent holes defined by said first bottom wall, respectively, said cutting board having a smooth surface and free of any vent holes.

* * * * *